(12) United States Patent
Mori et al.

(10) Patent No.: US 11,588,163 B2
(45) Date of Patent: Feb. 21, 2023

(54) FUEL CELL MOUNT APPARATUS

(71) Applicant: HONDA MOTOR CO., LTD., Tokyo (JP)

(72) Inventors: Takanori Mori, Tokyo (JP); Kenji Taruya, Wako (JP); Daishi Igarashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/382,403

(22) Filed: Jul. 22, 2021

(65) Prior Publication Data

US 2022/0037688 A1 Feb. 3, 2022

(30) Foreign Application Priority Data

Jul. 30, 2020 (JP) .............................. JP2020-129376

(51) Int. Cl.

| *H01M 8/04746* | (2016.01) |
|---|---|
| *H01M 8/04029* | (2016.01) |
| *H01M 8/04089* | (2016.01) |
| *H01M 8/04082* | (2016.01) |

(Continued)

(52) U.S. Cl.
CPC ... *H01M 8/04753* (2013.01); *H01M 8/04029* (2013.01); *H01M 8/04089* (2013.01); *H01M 8/04201* (2013.01); *H01M 8/04388* (2013.01); *H01M 8/04432* (2013.01); *H01M 8/04768* (2013.01); *H01M 8/2484* (2016.02); *H01M 2250/20* (2013.01)

(58) Field of Classification Search
CPC ................................................ H01M 8/04753
See application file for complete search history.

(56) References Cited

U.S. PATENT DOCUMENTS

| 2007/0166485 A1* | 7/2007 | Matsumoto | ....... H01M 8/04559 428/13 |
|---|---|---|---|
| 2011/0200906 A1* | 8/2011 | Wu | ....... H01M 8/249 429/452 |
| 2018/0342746 A1* | 11/2018 | Lee | ........................... H02J 1/00 |

(Continued)

FOREIGN PATENT DOCUMENTS

| EP | 3324472 A1 * | 5/2018 | ........ H01M 8/04225 |
|---|---|---|---|
| JP | 2006-200564 | 8/2006 | |

(Continued)

OTHER PUBLICATIONS

Japanese Office Action for Japanese Patent Application No. 2020-129376 dated Feb. 8, 2022.

*Primary Examiner* — Brian R Ohara
(74) *Attorney, Agent, or Firm* — Amin, Turocy & Watson, LLP (57) ABSTRACT

A fuel cell mount apparatus includes a plurality of fuel cell stacks, a pipe arrangement, a fluid adjustment part, a pressure detection part, and a control device. The pipe arrangement is individually connected to each of the fuel cell stacks. The fluid adjustment part adjusts a pressure or a flow rate of a fluid which flows through the pipe arrangement. The pressure detection part is disposed on a portion which requires a desired pressure or flow rate of the fluid in the pipe arrangement and detects the pressure of the fluid. The control device controls the fluid adjustment part on the basis of a detection result of the pressure detection part.

6 Claims, 2 Drawing Sheets

(51) Int. Cl.
    *H01M 8/0438*    (2016.01)
    *H01M 8/2484*    (2016.01)

(56) References Cited

U.S. PATENT DOCUMENTS

2019/0280320 A1* 9/2019 Farnsworth ............. B60L 58/33
2019/0372140 A1* 12/2019 Hayase ............. H01M 8/04097
2020/0153011 A1* 5/2020 Kumei ............. H01M 8/04164

FOREIGN PATENT DOCUMENTS

JP    2011-165636    8/2011
WO    2016/027335    2/2016

* cited by examiner

FUEL CELL MOUNT APPARATUS

CROSS-REFERENCE TO RELATED APPLICATION

Priority is claimed on Japanese Patent Application No. 2020-129376, filed on Jul. 30, 2020, the contents of which are incorporated herein by reference.

BACKGROUND

Field of the Invention

The present invention relates to a fuel cell mount apparatus that includes a fuel cell system such as a fuel cell vehicle.

Background

Vehicles that include a fuel cell system as a vehicle drive power source are known (for example, refer to Japanese Unexamined Patent Application, First Publication No. 2006-200564 and the like).

The fuel cell system that is mounted on this type of vehicle includes a fuel cell stack that generates electric power by electrochemical reaction of hydrogen (fuel gas) and oxygen (oxidizing agent gas), a hydrogen tank that supplies a hydrogen gas to the fuel cell stack, and an air compressor that supplies air which contains oxygen to the fuel cell stack.

In recent years, even large-size vehicles such as trucks have been developed which employ a fuel cell system as a drive power source. Since large-size vehicles require a large drive force, a plurality of fuel cell stacks are mounted on such large-size vehicles, and a variety of gas pipe arrangements and liquid pipe arrangements are individually connected to each of the fuel cell stacks.

SUMMARY

In a fuel cell mount apparatus like the large-size vehicle described above on which a plurality of fuel cell stacks are mounted, it may be difficult to make uniform the length, the drawn direction, and the like of the gas pipe arrangement and the liquid pipe arrangement that are connected to each fuel cell stack due to the layout relationship with another device or the like. When the length or the drawn direction of the gas pipe arrangement or the liquid pipe arrangement that is connected to each fuel cell stack is different, the pressure and the flow rate of the fluid at the same required portion in the pipe arrangement vary for each mounted fuel cell stack. Therefore, a setting adjustment of a fluid adjustment part such as an air compressor, a flow adjustment valve, a cooling liquid pump, or the like that is arranged on the pipe arrangement for each fuel cell stack is required. As a result, a large amount of time is required when developing a new fuel cell mount apparatus or when changing some pipe arrangement specifications.

An aspect of the present invention provides a fuel cell mount apparatus capable of allowing a fluid having an appropriate pressure and flow rate to flow to a required portion in a pipe arrangement without requiring a cumbersome setting adjustment of a fluid adjustment part in the pipe arrangement even in a case where a length or a drawn direction of the pipe arrangement that is connected to each fuel cell stack is different.

A fuel cell mount apparatus according to an aspect of the invention includes: a plurality of fuel cell stacks; a pipe arrangement that is individually connected to each of the fuel cell stacks; a fluid adjustment part that adjusts a pressure or a flow rate of a fluid which flows through the pipe arrangement; a pressure detection part that is disposed on a portion which requires a desired pressure or flow rate of the fluid in the pipe arrangement and that detects the pressure of the fluid; and a control device that controls the fluid adjustment part based on a detection result of the pressure detection part.

According to the configuration described above, in the pipe arrangement that is connected to each fuel cell stack, the pressure of the fluid is detected by the pressure detection part that is arranged on a portion which requires the pressure or the flow rate of the fluid. The control device controls the fluid adjustment part of each pipe arrangement on the basis of the detection result by each pressure detection part. Therefore, even in a case where a pressure loss is different for each pipe arrangement, the pressure or the flow rate of the fluid that flows through the required portion of the pipe arrangement of each stack can be appropriately controlled by the control of the fluid adjustment part by the control device.

In the fuel cell mount apparatus, each of the pipe arrangements that branches from one suction port and that individually supplies suctioned air to each of the fuel cell stacks may be connected to each of the fuel cell stacks, the fluid adjustment part may be an air compressor that supplies air to the fuel cell stack, the pipe arrangement may include a suction passage that introduces air to the air compressor from the suction port and a feed passage that feeds the air which is discharged from the air compressor to the fuel cell stack, and the pressure detection part may be arranged on the feed passage and on the suction passage in a vicinity of the air compressor.

In this case, since the pressure ratio of the feed side and the suction side of the air compressor can be obtained on the basis of the pressure of the feed passage and the vicinity of the air compressor of the suction passage, and the rotation of the air compressor can be controlled in response to the pressure ratio, it is possible to prevent a surge pressure in each suction passage from being generated regardless of the variation in the pressure loss of the suction passage of each stack.

The control device may control an output of the air compressor such that an air pressure of the fuel cell stack reaches a target air pressure, may obtain a pressure ratio of a feed side and a suction side of the air compressor based on a detection result of the pressure detection part, and may lower the output of the air compressor when the obtained pressure ratio becomes equal to or more than a specified pressure ratio.

In this case, the control device basically controls the output of the air compressor to reach the target air pressure at the fuel cell stack and prevents the surge pressure from being generated by reducing the output of the air compressor when the pressure ratio of the feed side and the suction side of the air compressor approaches a pressure ratio that generates the surge pressure.

The pipe arrangement may include a discharge passage of a hydrogen gas that is discharged from the fuel cell stack, the fluid adjustment part may be a purge valve that adjusts a flow rate of the hydrogen gas which flows through the discharge passage, and the pressure detection part may be arranged on a downstream side of the purge valve of the discharge passage.

In this case, since the opening degree of the purge valve can be controlled on the basis of the pressure on the downstream side of the purge valve of the discharge passage, the hydrogen gas can be smoothly discharged from the discharge passage regardless of the variation in the pressure loss of the discharge passage on the downstream side of the purge valve of each stack.

The pipe arrangement may include a water discharge passage that discharges water separated from a hydrogen gas which has flowed in the fuel cell stack, the fluid adjustment part may be a drain valve that adjusts a flow rate of the water which flows through the water discharge passage, and the pressure detection part may be disposed on a downstream side of the drain valve of the water discharge passage.

In this case, since the opening degree of the drain valve can be controlled on the basis of the pressure on the downstream side of the drain valve of the water discharge passage, the water can be smoothly discharged from the water discharge passage regardless of the variation in the pressure loss on the downstream side of the drain valve of the water discharge passage of each stack.

The pipe arrangement may include: a cooling liquid discharge passage that allows a cooling liquid which has cooled the fuel cell stack to flow to a cooling device; and a cooling liquid feed passage that feeds the cooling liquid which has flowed through the cooling device to the fuel cell stack, the fluid adjustment part may be a cooling liquid pump that allows the cooling liquid to flow to the fuel cell stack and the cooling liquid feed passage, and the pressure detection part may detect a pressure difference between a portion of the cooling liquid feed passage close to a connection part with the fuel cell stack and a portion of the cooling liquid discharge passage close to a connection part with the fuel cell stack.

In this case, since the discharge amount of the cooling liquid by the cooling liquid pump can be controlled on the basis of the pressure difference between the inflow part and the discharge part of the cooling liquid of the fuel cell stack, it is possible to allow a cooling liquid having a stable flow rate to flow to the fuel cell stack regardless of the variation in the pressure loss at the cooling liquid discharge passage or the cooling liquid feed passage of each stack.

The pipe arrangement may be a gas pipe arrangement that connects the hydrogen tank to the fuel cell stack, the fluid adjustment part may be a variable pressure adjustment valve that is arranged on the gas pipe arrangement in a vicinity of the hydrogen tank, and the pressure detection part may be arranged in a vicinity of the fuel cell stack.

In this case, since the supply pressure from the hydrogen tank can be controlled by the variable pressure adjustment valve on the basis of the pressure in the vicinity of the fuel cell stack, a hydrogen gas having a stable flow rate and pressure can be supplied to the fuel cell stack regardless of the variation in the pressure loss at the gas pipe arrangement of each stack.

In an aspect of the present invention, since the pressure detection part is arranged on a portion in the pipe arrangement that requires a desired pressure or flow rate of a fluid, and the fluid adjustment part is controlled on the basis of the detection result of the pressure detection part, the pressure or the flow rate of the fluid that flows in the pipe arrangement can be appropriately controlled by the fluid adjustment part regardless of the variation in the pressure loss in the pipe arrangement of each stack. Accordingly, when the present invention is employed, it is possible to allow a fluid having an appropriate pressure and flow rate to flow to the required portion in the pipe arrangement without requiring a cumbersome setting adjustment of the fluid adjustment part in the pipe arrangement of each stack.

DESCRIPTION OF EMBODIMENTS

Hereinafter, an embodiment of the present invention will be described with reference to the drawings.

Figure 1:
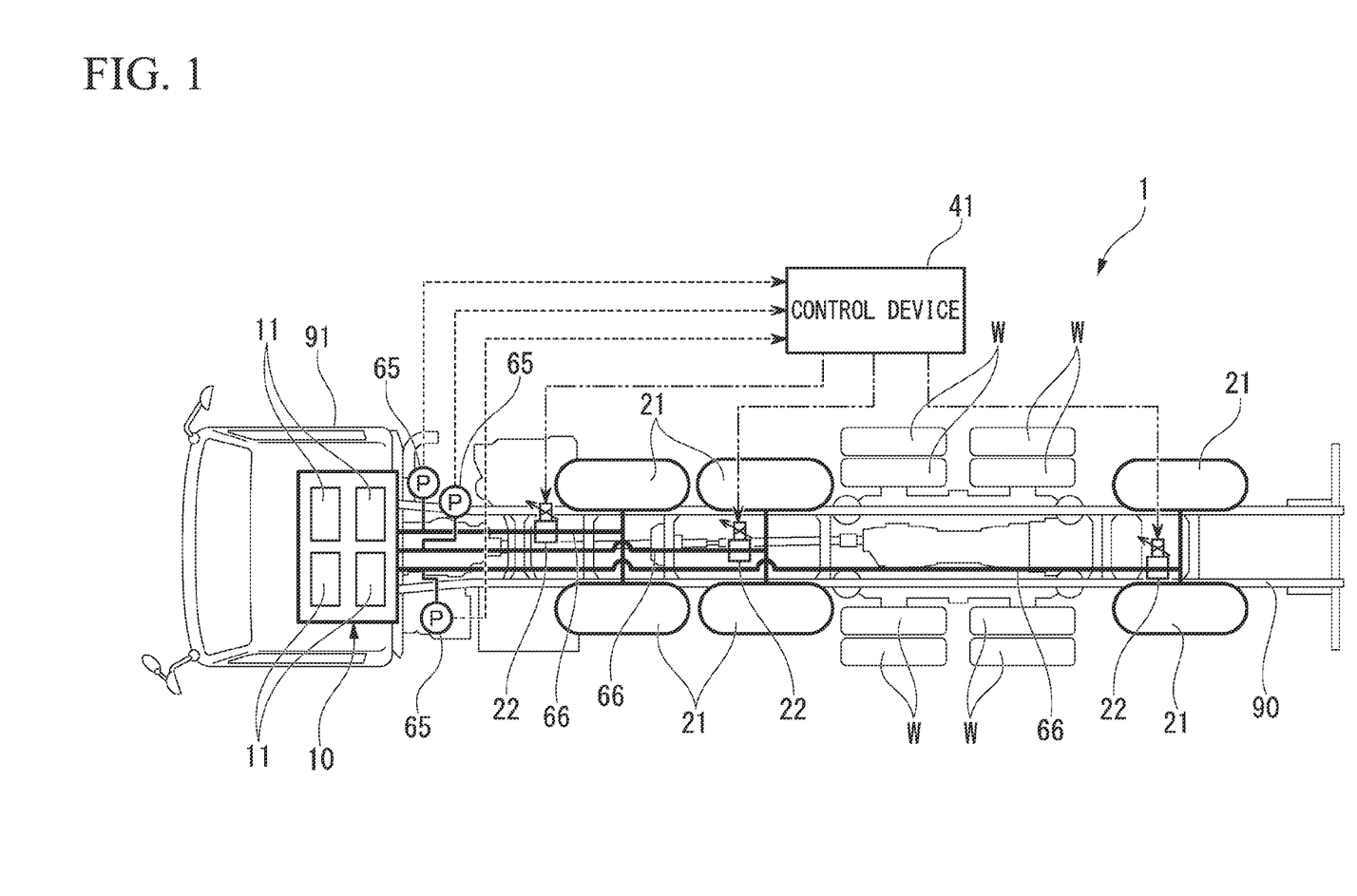
FIG. 1 is a plan view of a fuel cell vehicle (fuel cell mount apparatus) of an embodiment.

FIG. 1 is a plan view of a fuel cell vehicle 1 which is one form of a fuel cell mount apparatus.

The fuel cell vehicle 1 of the present embodiment is a truck in which a load can be loaded. The fuel cell vehicle 1 includes a vehicle body frame 90 that extends along a vehicle body front-to-rear direction, and an occupant room 91 is supported by a front part of the vehicle body frame 90. A rear side of the occupant room 91 of the vehicle body frame 90 is a load mount part 5. A motor M (refer to FIG. 2) for driving the vehicle and a fuel cell system 10 that supplies electric power to the motor M are mounted on the fuel cell vehicle 1. In FIG. 1, the fuel cell system 10 is shown by a solid line, but a main part of the fuel cell system 10 is actually disposed below the occupant room 91 and the vehicle body frame 90.

A reference numeral W in FIG. 1 indicates a wheel of the fuel cell vehicle 1, and a reference numeral 21 indicates a hydrogen tank that is dispersedly mounted at a plurality of positions of the vehicle body frame 90.

A plurality (for example, four) of fuel cell stacks 11 that generate electric power by electrochemical reaction of hydrogen and oxygen (air) are mounted on the fuel cell system 10 mounted on the fuel cell vehicle 1. A variety of pipe arrangements are individually connected to each fuel cell stack 11 as described later in detail. The fuel cell stacks 11 have a similar basic configuration although the length, the drawn direction, and the like of the variety of pipe arrangements that are connected are different.

Figure 2:
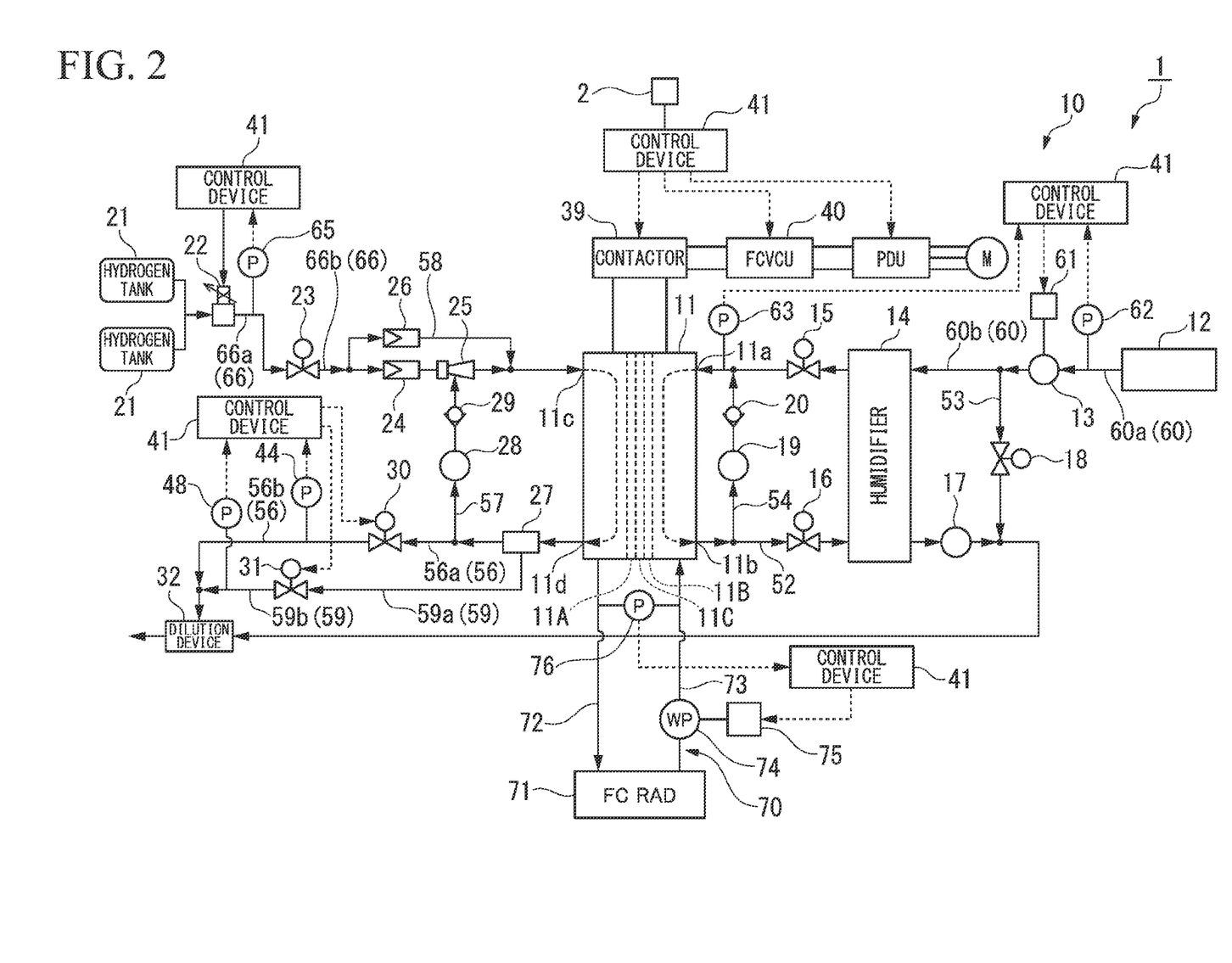
FIG. 2 is a configuration view of a fuel cell system that is employed by the fuel cell vehicle of the embodiment.

FIG. 2 is a view showing a schematic configuration of the fuel cell system 10 around one fuel cell stack 11. In the fuel cell system 10, a plurality (for example, four) of configurations shown in FIG. 2 are provided.

The fuel cell vehicle 1 includes a motor M for driving the vehicle and a power drive unit PDU that controls the motor M. The fuel cell system 10 is mounted as an electric power source on the fuel cell vehicle 1.

The fuel cell vehicle 1 includes a switch 2, which is, for example, an ignition switch or the like, that outputs a start signal which commands a start of the vehicle in response to an input operation by a driver or a stop signal which commands a stop.

As shown in FIG. 2, the fuel cell system 10 includes a fuel cell stack 11, a suction port 12 that is common to each stack, an air compressor 13, a humidifier 14, a seal inlet valve 15, a seal outlet valve 16, a pressure control valve 17, a bypass valve 18, a discharge recirculation pump 19, and a non-return valve 20. The fuel cell system 10 further includes a hydrogen tank 21, a variable pressure adjustment valve 22, an injector 24, an ejector 25, a bypass injector 26, a gas-liquid separator 27, a hydrogen pump 28, a non-return valve 29, a purge valve 30, a drain valve 31, a dilution device 32 that is common to each stack, a contactor 39, a voltage adjustment device (FCVCU) 40, and a control device 41. The fuel cell system 10 includes a stack-cooling circuit 70 for cooling each fuel cell stack 11 by a cooling liquid.

In FIG. 2, although a plurality of control devices 41 are illustrated for the convenience of illustration, the plurality of control devices 41 in the drawing are the same control device.

The fuel cell stack 11 includes: a laminate body (not shown) in which a plurality of cells of the fuel cell are laminated; and a pair of end plates (not shown) that sandwich the laminate body from both sides in a lamination direction.

The cells of the fuel cell include: a membrane electrode junction body (MEA: Membrane Electrode Assembly); and a pair of separators that sandwich the membrane electrode junction body from both sides in a junction direction.

The membrane electrode junction body includes: an anode 11A (fuel electrode) that is constituted of an anode catalyst and a gas diffusion layer; a cathode 11B (oxygen electrode) that is constituted of a cathode catalyst and a gas diffusion layer; and a solid polymer electrolyte membrane 11C that is formed of a cation exchange membrane or the like and that is sandwiched from both sides in a thickness direction by the anode 11A and the cathode 11B.

A hydrogen gas is supplied from the hydrogen tank 21 to the anode 11A of the fuel cell stack 11, and air which is an oxidizing agent gas that contains oxygen is supplied from the air compressor 13 to the cathode 11B.

The hydrogen that is supplied to the anode 11A is ionized by a catalytic reaction on the anode catalyst, and hydrogen ions move to the cathode 11B via the solid polymer electrolyte membrane 11C that is moderately humidified. Electrons that are generated in accordance with the movement of the hydrogen ions are extracted to an external circuit (the voltage adjustment device 40 or the like) as a direct current.

The hydrogen ions that have moved from the anode 11A onto the cathode catalyst of the cathode 11B react with the oxygen that is supplied to the cathode 11B and the electrons on the cathode catalyst and generate water.

The contactor 39 is connected to a positive electrode and a negative electrode of the fuel cell stack 11 and switches between connection and disconnection of the fuel cell stack 11 and an electric load (for example, a power drive unit PDU or the like) by a control by the control device 41.

The voltage adjustment device (FCVCU) 40 is arranged between the electric load and the positive and negative electrodes of the fuel cell stack 11 via the contactor 39 and adjusts a voltage and a current that are output from the fuel cell stack 11 by the control by the control device 41.

The air compressor 13 is provided in the middle of an air supply pipe arrangement 60 (pipe arrangement) that connects the cathode 11B of the fuel cell stack 11 to the one suction port 12 that is common to each stack. The air supply pipe arrangement 60 includes: a suction passage 60a that introduces air from the suction port 12 to the air compressor 13; and a feed passage 60b that feeds air which is discharged from the air compressor 13 to the fuel cell stack 11. The air compressor 13 includes a motor 61 for driving which is driven and controlled by the control device 41. The air compressor 13 introduces and compresses air from the one suction port 12 that is common to each stack by a drive force of the motor 61 and feeds the compressed air via the feed passage 60b to the cathode 11B.

In the present embodiment, the air compressor 13 constitutes a fluid adjustment part that adjusts the pressure (suction pressure) in the vicinity of the air compressor 13 in the suction passage 60a in the air supply pipe arrangement 60 (pipe arrangement).

A plurality of fuel cell stacks 11 are arranged to be spaced apart from each other below the occupant room 91. Therefore, the suction passage 60a that connects the suction port 12 to the air compressor 13 in the air supply pipe arrangement 60 differs in a length or a drawn direction for each fuel cell stack 11.

A suction-side pressure sensor 62 (pressure detection part) for detecting the air pressure in the vicinity of the suction part of the air compressor 13 is provided on the suction passage 60a that corresponds to each fuel cell stack 11. A detection signal that is detected by the suction-side pressure sensor 62 is input to the control device 41. A feed-side pressure sensor 63 (pressure detection part) for detecting the air pressure on the cathode 11B side of the fuel cell stack 11 is provided on the feed passage 60b that corresponds to each fuel cell stack 11. A detection signal that is detected by the feed-side pressure sensor 63 is input to the control device 41.

The control device 41 controls the output of the motor 61 of the air compressor 13 so as to reach a target air pressure that is required by the fuel cell stack 11. The control device 41 increases the output of the motor 61 of the air compressor 13 so as to increase the pressure on the feed passage 60b side in a case where the air pressure (a pressure that is detected by the feed-side pressure sensor 63) on the fuel cell stack 11 side does not reach the target air pressure. At this time, when the pressure ratio of the feed side and the suction side of the air compressor 13 becomes equal to or higher than a predetermined value, the surge pressure in the suction passage 60a is easily generated. Therefore, in order to prevent the surge pressure in the suction passage 60a from being generated, the control device 41 monitors the pressure of the suction side and the feed side of the air compressor 13 by the suction-side pressure sensor 62 and the feed-side pressure sensor 63 and reduces the output of the air compressor 13 when the pressure ratio at the air compressor 13 becomes equal to more than a predetermined pressure ratio. More specifically, for example, by lowering the air target pressure of the fuel cell stack 11, the output of the air compressor 13 is reduced.

On the other hand, the humidifier 14 includes, for example, a water-permeable membrane such as a hollow fiber membrane. The humidifier 14 uses air (cathode-off gas) that is discharged from the cathode discharge port 11b of the fuel cell stack 11 to the air discharge passage 52 as a gas for humidification and humidifies air (cathode gas) that is sent from the air compressor 13 to the feed passage 60b of the air supply pipe arrangement 60.

More specifically, the humidifier 14 causes the air that is delivered from the air compressor 13 to come into contact with the air (discharge air) in a wet state which is discharged from the cathode discharge port 11b of the fuel cell stack 11 via the water permeation membrane and thereby adds water that has passed through a membrane hole of the water-permeable membrane among water (in particular, water vapor) that is contained in the discharge air to the air (cathode gas).

The seal inlet valve 15 is provided on the feed passage 60b that connects the air compressor 13 to a cathode supply port 11a which is capable of supplying air to the cathode 11B of the fuel cell stack 11. The seal inlet valve 15 opens and closes the feed passage 60b by a control by the control device 41. The seal inlet valve 15 seals an upstream side of the cathode 11B by closing the feed passage 60b.

The seal outlet valve 16 is provided on an air discharge passage 52 that connects the dilution device 32 to the cathode discharge port 11b which is capable of discharging used air (cathode-off gas) from the cathode 11B of the fuel cell stack 11. The seal outlet valve 16 opens and closes the air discharge passage 52 by a control by the control device 41. The seal outlet valve 16 seals the downstream side of the cathode 11B by closing the air discharge passage 52.

The pressure control valve 17 is provided in the air discharge passage 52 between the humidifier 14 and the dilution device 32 and controls the pressure of the discharge air (cathode-off gas) that flows through the air discharge passage 52 by a control by the control device 41.

The bypass valve 18 is provided on a bypass passage 53 that connects a part of the feed passage 60b between the air compressor 13 and the humidifier 14 to a part of the air discharge passage 52 between the pressure control valve 17 and the dilution device 32. The bypass passage 53 is a passage that branches from the feed passage 60b and bypasses the cathode 11B. The bypass passage 53 supplies air that is fed from the air compressor 13 directly to the dilution device 32.

The bypass valve 18 opens and closes the bypass passage 53 by a control by the control device 41.

The discharge recirculation pump 19 is provided on a discharge recirculation passage 54 that connects a part of the feed passage 60b between the seal inlet valve 15 and the cathode supply port 11a to a part of the air discharge passage 52 between the cathode discharge port 11b and the sealing outlet valve 16.

The discharge recirculation pump 19 causes at least part of the cathode-off gas that passes through the cathode 11B of the fuel cell stack 11 and is discharged from the cathode discharge port 11b to the air discharge passage 52 to flow through the discharge recirculation passage 54. Then, the cathode-off gas that has flowed through the discharge recirculation passage 54 is mixed with the air (cathode gas) that advances from the seal inlet valve 15 toward the cathode supply port 11a and is supplied to the cathode 11B again.

The non-return valve 20 is provided on the discharge recirculation passage 54 so as to allow only the flow of air in a direction from the air discharge passage 52 toward the feed passage 60b of the air supply pipe arrangement 60 and to block the flow of air in the opposite direction.

The hydrogen tank 21 is mounted dispersedly at a plurality of positions of the vehicle body frame 90 shown in FIG. 1 such that a predetermined number of hydrogen tanks 21 are as one group. The hydrogen tanks 21 that constitute each group are joined together by a pipe arrangement. The hydrogen tank 21 of each group is connected to the anode supply port 11c of the corresponding fuel cell stack 11 by a gas pipe arrangement 66. However, since each group of the hydrogen tank 21 has a different mount position on the vehicle body frame 90 in the front-to-rear direction of the vehicle body, the length of the gas pipe arrangement 66 that connects the hydrogen tank 21 to the fuel cell stack 11 of each group is different for each group.

In the fuel cell vehicle of the present embodiment, since the number of the mounted fuel cell stacks 11 is four, and on the other hand, the number of groups of the hydrogen tank 21 is three, two of the four fuel cell stacks 11 are connected to a group of the common hydrogen tank 21. However, the number of groups of the hydrogen tanks 21 that are mounted on the fuel cell vehicle 1 may be four such that each of the four fuel cell stacks 11 is connected to a different group of the hydrogen tanks 21.

A cutoff valve 23 which blocks the flow of a hydrogen gas in the gas pipe arrangement 66 by a control by the control device 41 is provided at a position proximate to the fuel cell stack 11 of the gas pipe arrangement 66 that is connected to each group of hydrogen tank 21. Here, a further upstream side (hydrogen tank 21 side) portion of each gas pipe arrangement 66 than the cutoff valve 23 is referred to as an upstream-side flow passage 66a, and a further downstream side (fuel cell stack 11 side) portion of the gas pipe arrangement 66 than the cutoff valve 23 is referred to as a downstream-side flow passage 66b.

The variable pressure adjustment valve 22 that is constituted of an electromagnetic valve or the like is provided on the upstream-side flow passage 66a of each gas pipe arrangement 66 in the vicinity of the hydrogen tank 21. The variable pressure adjustment valve 22 adjusts the pressure of the hydrogen gas that flows through the upstream-side flow passage 66a by a control by the control device 41. A gas pressure sensor 65 (pressure detection part) for detecting the pressure of the hydrogen gas in the vicinity of the cutoff valve 23 of the upstream-side flow passage 66a is provided on the upstream-side flow passage 66a of each gas pipe arrangement 66 in the vicinity of the cutoff valve 23. A detection signal that is detected by the gas pressure sensor 65 is input to the control device 41.

The control device 41 controls the variable pressure adjustment valve 22 such that the hydrogen pressure near the cutoff valve 23 of the upstream-side flow passage 66a of each gas pipe arrangement 66 reaches the target hydrogen pressure. Therefore, even when the pressure loss at the upstream-side flow passage 66a differs for the gas pipe arrangement 66 of each stack due to the difference in the length of the upstream-side flow passage 66a of each gas pipe arrangement 66, when the target hydrogen pressure is the same, the hydrogen pressure at a portion close to the cutoff valve 23 can be substantially the same by a control of each variable pressure adjustment valve 22 by the control device 41.

The cutoff valve 23 is capable of blocking between the upstream-side flow passage 66a of the gas pipe arrangement 66 and the downstream-side flow passage 66b by a control by the control device 41.

The injector 24 is provided on the downstream-side flow passage 66b between the cutoff valve 23 and the anode supply port 11c and intermittently supplies a hydrogen gas of the target hydrogen pressure to the anode supply port 11c at a predetermined period by a control by the control device 41. Thereby, an inter-electrode differential pressure between the anode 11A and the cathode 11B of the fuel cell stack 11 is maintained to be a predetermined pressure.

The ejector 25 is provided on the downstream-side flow passage 66b between the injector 24 and the anode supply port 11c.

The ejector 25 causes at least part of a discharge gas (anode-off gas) that contains unreacted hydrogen which passes through the anode 11A of the fuel cell stack 11 and is discharged from an anode discharge port 11d to a hydrogen gas discharge passage 56 (discharge passage) to flow through a hydrogen gas circulation passage 57 that connects the hydrogen gas discharge passage 56 to the upstream-side flow passage 66a. Then, the anode-off gas that has flowed through the hydrogen gas circulation passage 57 is mixed with the hydrogen gas of the upstream-side flow passage 66a that advances from the injector 24 toward the anode supply port 11c and is supplied to the anode 11A again.

The bypass injector 26 is provided on a bypass passage 58 that bypasses the injector 24 and the ejector 25 in the upstream-side flow passage 66a between the cutoff valve 23 and the anode supply port 11c and is connected to the anode supply port 11c side of the upstream-side flow passage 66a.

The bypass injector 26 assists the injector 24 by a control by the control device 41 and supplies a hydrogen gas of the target hydrogen pressure to the anode supply port 11c.

The gas-liquid separator 27 is provided on the hydrogen gas discharge passage 56 between the anode discharge port 11d and the hydrogen gas circulation passage 57.

The gas-liquid separator 27 separates water that is contained in the anode-off gas which passes through the anode 11A of the fuel cell stack 11 and which is discharged from the anode discharge port 11d. The anode-off gas after separation is discharged from a gas discharge port (not shown) that is connected to the hydrogen gas discharge passage 56, and the water after separation is discharged from a water discharge port (not shown) that is connected to a water discharge passage 59.

Hereinafter, a flow passage of the hydrogen gas discharge passage 56 on the further upstream side than the purge valve 30 is referred to as an upstream-side flow passage 56a, and a flow passage of the hydrogen gas discharge passage 56 on the further downstream side than the purge valve 30 is referred to as a downstream-side flow passage 56b. The hydrogen pump 28 is provided on a hydrogen gas circulation passage 57 that is connected to a downstream position of the gas-liquid separator 27 of the upstream-side flow passage 56a and an auxiliary flow introduction port (not shown) of the ejector 25.

The hydrogen pump 28 causes at least part of the anode-off gas that passes through the anode 11A of the fuel cell stack 11 and is discharged from the anode discharge port 11d to the hydrogen gas discharge passage 56 to flow through the hydrogen gas circulation passage 57.

The non-return valve 29 is provided on the hydrogen gas circulation passage 57 so as to allow only the flow of the anode-off gas in a direction from the hydrogen gas discharge passage 56 toward the upstream-side flow passage 66a of the gas pipe arrangement 66 and to block the flow of the gas in the opposite direction.

The purge valve 30 is provided between the upstream-side flow passage 56a of the hydrogen gas discharge passage 56 and the downstream-side flow passage 56b. The purge valve 30 is constituted of a variable flow rate adjustment valve. The purge valve 30 can adjust the flow rate of the anode-off gas (hydrogen gas) that flows from the upstream-side flow passage 56a of the hydrogen gas discharge passage 56 to the downstream-side flow passage (flows from the gas-liquid separator 27 to the dilution device 32) by a control by the control device 41.

A purge pressure sensor 44 for detecting the pressure of the anode-off gas (hydrogen gas) that flows through the downstream-side flow passage 56b is provided on the downstream-side flow passage 56b (the downstream side of the purge valve 30) of the hydrogen gas discharge passage 56. The purge pressure sensor 44 is arranged in the vicinity of the purge valve 30 of the downstream-side flow passage 56b. A detection signal that is detected by the purge pressure sensor 44 is input to the control device 41.

In the hydrogen gas discharge passage 56, the purge pressure sensor 44 constitutes a pressure detection part, and the purge valve 30 constitutes a fluid adjustment part.

The control device 41 controls the opening degree of the purge valve 30 in response to the pressure that is detected by the purge pressure sensor 44. Specifically, the control device 41 controls the opening degree of the purge valve 30 such that the pressure in the vicinity of the gas discharge port of the purge valve 30 becomes a predetermined value in the hydrogen gas discharge passage 56 that corresponds to each stack. Therefore, even when the pressure loss at each downstream-side flow passage 56b differs for each stack due to the difference in the length of the downstream-side flow passage 56b of the hydrogen gas discharge passage 56 or the like that corresponds to each stack, the flow rate of the anode-off gas (hydrogen gas) that is discharged via each downstream-side flow passage 56b to the dilution device 32 can be substantially the same by a control of each purge valve 30 by the control device 41.

The drain valve 31 is provided on the water discharge passage 59 between the water discharge port of the gas-liquid separator 27 and the dilution device 32. Hereinafter, a flow passage of the water discharge passage 59 on a further upstream side than the drain valve 31 is referred to as an upstream-side flow passage 59a, and a flow passage of the water discharge passage 59 on a further downstream side than the drain valve 31 is referred to as a downstream-side flow passage 59b.

The drain valve 31 is constituted of a variable flow rate adjustment valve. The drain valve 31 can adjust the flow rate of water that flows from the upstream-side flow passage 59a of the water discharge passage 59 to the downstream-side flow passage 59b (flows from the gas-liquid separator 27 toward the dilution device 32) by a control by the control device 41.

A drain pressure sensor 48 for detecting a pressure in the vicinity of the drain valve 31 of the downstream-side flow passage 59b is provided on the downstream-side flow passage 59b (the downstream side of the drain valve 31) of the water discharge passage 59. The drain pressure sensor 48 is arranged on the downstream-side flow passage 59b in the vicinity of the drain valve 31. A detection signal that is detected by the drain pressure sensor 48 is input to the control device 41.

In the water discharge passage 59, the drain pressure sensor 48 constitutes a pressure detection part, and the drain valve 31 constitutes a fluid adjustment part.

The control device 41 controls the opening degree of the drain valve 31 in response to the pressure that is detected by the drain pressure sensor 48. Specifically, the control device 41 controls the opening degree of the drain valve 31 such that the pressure in the vicinity of the water discharge port of the drain valve 31 becomes a predetermined value in the water discharge passage 59 that corresponds to each stack. Therefore, even when the pressure loss at each downstream-side flow passage 59b differs for each stack due to the difference in the length of the downstream-side flow passage 59b of the water discharge passage 59 or the like that corresponds to each stack, the flow rate of the water that is discharged via each downstream-side flow passage 59b to the dilution device 32 can be substantially the same by a control of each drain valve 31 by the control device 41.

The dilution device 32 is connected to the air discharge passage 52, the hydrogen gas discharge passage 56, and the water discharge passage 59.

The dilution device 32 dilutes the hydrogen concentration of the anode-off gas that is supplied from the purge valve 30 by the air that is supplied from the bypass valve 18 or the cathode-off gas that is supplied from the pressure control valve 17. Then, the discharge gas in which the hydrogen concentration after dilution is reduced to a predetermined concentration or less is discharged to the outside (atmosphere).

The stack-cooling circuit 70 includes: an internal cooling passage (not shown) of the fuel cell stack 11; a stack-cooling radiator 71 (cooling device) that cools a cooling liquid which has cooled the fuel cell stack 11; a cooling liquid discharge passage 72 that causes the cooling liquid which has flowed out of the internal cooling passage of the fuel cell stack 11 to flow to the stack-cooling radiator 71; and a cooling liquid feed passage 73 that feeds the cooling liquid which has flowed through the stack-cooling radiator 71 to the internal cooling passage of the fuel cell stack 11. A cooling liquid pump 74 that suctions the cooling liquid which has passed through the stack-cooling radiator 71 and feeds the cooling liquid to the internal cooling passage side of the fuel cell stack 11 is provided on the cooling liquid feed passage 73. The cooling liquid pump 74 includes a drive motor 75. The drive motor 75 is controlled by the control device 41.

A differential pressure sensor 76 is provided between a portion of the cooling liquid feed passage 73 close to a connection part with the fuel cell stack 11 and a portion of the cooling liquid discharge passage 72 close to a connection part with the fuel cell stack 11. The differential pressure sensor 76 detects a pressure difference between the portions close to both connection parts. A detection signal of the differential pressure sensor 76 is input to the control device 41.

In the stack-cooling circuit 70, the cooling liquid feed passage 73 and the cooling liquid discharge passage 72 constitute a pipe arrangement, and the differential pressure sensor 76 constitutes a pressure detection part. Alternatively, the cooling liquid pump 74 constitutes a fluid adjustment part.

The control device 41 controls the output of the cooling liquid pump 74 in response to the pressure difference between an inlet side and an outlet side of the fuel cell stack 11 that is detected by the differential pressure sensor 76. Specifically, the control device 41 controls the output of the cooling liquid pump 74 such that the pressure difference between the inlet side and the outlet side of the fuel cell stack 11 becomes a predetermined value in the stack-cooling circuit 70 that corresponds to each stack. Therefore, even when the length of the cooling liquid feed passage 73 or the cooling liquid discharge passage 72 or the like differs in each stack, and thereby, the pressure loss at the cooling liquid feed passage 73 or the cooling liquid discharge passage 72 differs for each stack, the flow rate of the cooling liquid that flows through each fuel cell stack 11 can be substantially the same by a control of the cooling liquid pump 74 by the control device 41.

Advantage of Embodiment

In the fuel cell vehicle 1 (fuel cell mount apparatus) of the present embodiment, the suction-side pressure sensor 62 and the feed-side pressure sensor 63 are arranged on a portion of the suction passage 60*a* in the vicinity of the air compressor 13 and on the feed passage 60*b*, respectively, in the air supply pipe arrangement 60 that branches from the one suction port 12 and that individually supplies air to each fuel cell stack 11. The control device 41 controls the output of the air compressor 13 on the basis of the detection signal that is detected by the suction-side pressure sensor 62 and the feed-side pressure sensor 63.

Therefore, in the fuel cell vehicle 1 of the present embodiment, even when the pressure loss in the suction passage 60*a* varies for each stack due to the difference in the length of the suction passage 60*a* of the air supply pipe arrangement 60 or the like, it is possible to prevent a surge pressure in the suction passage 60*a* from being generated by a control of each air compressor 13 by the control device 41.

Specifically, in the fuel cell vehicle 1 (fuel cell mount apparatus) of the present embodiment, the control device 41 controls the output of the air compressor 13 such that the air pressure of the fuel cell stack 11 reaches the target air pressure, and furthermore, the control device 41 obtains the pressure ratio of the feed side and the suction side of the air compressor 13 on the basis of the detection result of the suction-side pressure sensor 62 and the feed-side pressure sensor 63. When the obtained pressure ratio becomes equal to or more than the specified pressure ratio, the control device 41 reduces the output of the air compressor 13 by lowering the target air pressure or the like.

Therefore, in the fuel cell vehicle 1 of the present embodiment, the control device 41 basically controls the output of the air compressor 13 so as to reach the target air pressure at each fuel cell stack 11 and reduces the output of the air compressor 13 when the pressure ratio of the feed side and the suction side of the air compressor 13 approaches the pressure ratio that generates the surge pressure, and thereby, it is possible to reliably prevent the surge pressure from being generated.

Further, in the fuel cell vehicle 1 (fuel cell mount apparatus) of the present embodiment, in the hydrogen gas discharge passage 56 that discharges the hydrogen gas (anode-off gas) from the fuel cell stack 11, the purge pressure sensor 44 is arranged on the downstream side (the downstream-side flow passage 56*b*) of the purge valve 30 of the hydrogen gas discharge passage 56. The control device 41 controls the opening degree of the purge valve 30 on the basis of the detection signal of the purge pressure sensor 44.

Therefore, in the fuel cell vehicle 1 of the present embodiment, even when the pressure loss in the downstream-side flow passage 56*b* varies for each stack due to the difference in the length of the downstream-side flow passage 56*b* on the further downstream side than the purge valve 30, the hydrogen gas can be smoothly discharged to the dilution device 32 by the opening degree control of each purge valve 30 by the control device 41.

Further, in the fuel cell vehicle 1 (fuel cell mount apparatus) of the present embodiment, in the water drain passage 59 that discharges the water which is separated from the hydrogen gas that has flowed in the fuel cell stack 11, the drain pressure sensor 48 is arranged on the downstream side (the downstream-side flow passage 59*b*) of the drain valve 31 of the water drain passage 59. The control device 41 controls the opening degree of the drain valve 31 on the basis of the detection signal of the drain pressure sensor 48.

Therefore, in the fuel cell vehicle 1 of the present embodiment, even when the pressure loss in the downstream-side flow passage 59*b* varies for each stack due to the difference in the length of the downstream-side flow passage 59*b* on the further downstream side than the drain valve 31, the water can be smoothly discharged to the dilution device 32 by the opening degree control of each drain valve 31 by the control device 41.

Further, in the fuel cell vehicle 1 (fuel cell mount apparatus) of the present embodiment, in the stack-cooling circuit 70 that cools each fuel cell stack 11, the differential pressure sensor 76 that detects the pressure difference between a portion of the cooling liquid feed passage 73 close to a connection part with the fuel cell stack 11 and a portion of the cooling liquid discharge passage 72 close to a connection part with the fuel cell stack 11 is provided. The control device 41 controls the output of the cooling liquid pump 74 on the basis of the detection signal of the differential pressure sensor 76.

Therefore, in the fuel cell vehicle 1 of the present embodiment, even when the pressure loss in the cooling liquid feed passage 73 or the cooling liquid discharge passage 72 varies for each stack due to the difference in the length of the cooling liquid feed passage 73 or the cooling liquid discharge passage 72 or the like, it is possible to cause a cooling liquid having a stable flow rate to flow to each fuel cell stack 11 by the output control of each cooling liquid pump 74 by the control device 41.

Further, in the fuel cell vehicle 1 (fuel cell mount apparatus) of the present embodiment, in the gas pipe arrangement 66 that connects the hydrogen tank 21 to the fuel cell stack 11, the gas pressure sensor 65 is arranged in the vicinity of the fuel cell stack 11. The control device 41 controls the variable pressure adjustment valve 22 that is arranged on the gas pipe arrangement 66 in the vicinity of the hydrogen tank 21 on the basis of the detection signal of the gas pressure sensor 65.

Therefore, in the fuel cell vehicle 1 of the present embodiment, even when the pressure loss in the upstream-side flow passage 66a varies for each stack due to the difference in the length of the upstream-side flow passage 66a of the gas pipe arrangement 66 or the like, it is possible to supply a hydrogen gas having a stable pressure and flow rate to each fuel cell stack 11 by the control of each variable pressure adjustment valve 22 by the control device.

As described above, in the fuel cell vehicle 1 of the present embodiment, a pressure detection part that detects the pressure of the air, the hydrogen gas, the water, or the like is arranged on a portion which requires a desired pressure or flow rate in the pipe arrangement that is individually connected to each of the fuel cell stacks 11, and the control device 41 controls a fluid adjustment part on the basis of the detection result of the pressure detection part. Therefore, when the fuel cell vehicle 1 of the present embodiment is employed, even in a case where the length of the pipe arrangement or the like differs for each stack, and the pressure loss varies, it is possible to appropriately control the pressure and the flow rate of the fluid that flows through each pipe arrangement by the control of the fluid adjustment part by the control device 41.

Accordingly, when the fuel cell vehicle 1 of the present embodiment is employed, it is possible to allow a fluid having an appropriate pressure and flow rate to flow to the required portion in the pipe arrangement without requiring a cumbersome setting adjustment of the fluid adjustment part in the pipe arrangement of each stack.

The present invention is not limited to the embodiment described above, and various design changes can be made without departing from the scope of the invention. For example, the above embodiment is described using a fuel cell vehicle 1 that includes a plurality of fuel cell stacks; however, the fuel cell mount apparatus in the present invention is not limited to the fuel cell vehicle and may be an apparatus that utilizes electric power which is generated by a plurality of fuel cell stacks. For example, the present invention may be applied to an automobile having two wheels, three wheels, four wheels, or the like or a large-size vehicle such as a bus or a truck. The fuel cell mount apparatus may be mounted on a mobile body (for example, a vessel, an air vehicle, or a robot) other than an electric vehicle or may be mounted on a stationary fuel cell system.

What is claimed is:
1. A fuel cell mount apparatus, comprising:
a plurality of fuel cell stacks;
a plurality of pipe arrangements each of which is connected to each fuel stack of the plurality of fuel cell stacks;
a fluid adjustment part that adjusts a pressure or a flow rate of a fluid which flows through each pipe arrangement of the plurality of pipe arrangements;
a pressure detection part that is disposed on a portion which requires a desired pressure or flow rate of the fluid in each pipe arrangement of the plurality of pipe arrangements and that detects the pressure of the fluid; and
a control device that controls the fluid adjustment part based on a detection result of the pressure detection part,
wherein each pipe arrangement of the plurality of pipe arrangements that is connected to one suction port and that supplies suctioned air to each of the plurality of fuel cell stacks is connected to each fuel cell stack of the plurality of fuel cell stacks,
the fluid adjustment part is an air compressor that supplies air to each fuel cell stack of the plurality of fuel cell stacks,
each pipe arrangement of the plurality of pipe arrangements includes a suction passage that introduces air to the air compressor from the suction port and a feed passage that feeds the air which is discharged from the air compressor to each fuel cell stack of the plurality of fuel cell stacks, and
the pressure detection part is arranged on the feed passage and on the suction passage in a vicinity of the air compressor.
2. The fuel cell mount apparatus according to claim 1, wherein the control device controls an output of the air compressor such that an air pressure of each fuel cell stack of the plurality of fuel cell stacks reaches a target air pressure, obtains a pressure ratio of a feed side and a suction side of the air compressor based on a detection result of the pressure detection part, and lowers the output of the air compressor when the obtained pressure ratio becomes equal to or more than a specified pressure ratio.
3. The fuel cell mount apparatus according to claim 1, wherein each pipe arrangement of the plurality of pipe arrangements comprises a discharge passage of a hydrogen gas that is discharged from each fuel cell stack of the plurality of fuel cell stacks,
the fluid adjustment part is a purge valve that adjusts a flow rate of the hydrogen gas which flows through the discharge passage, and
the pressure detection part is arranged on a downstream side of the purge valve of the discharge passage.
4. A fuel cell mount apparatus, comprising:
a plurality of fuel cell stacks;
a plurality of pipe arrangements each of which is connected to each fuel cell stack of the plurality of fuel cell stacks;
a fluid adjustment part that adjusts a pressure or a flow rate of a fluid which flows through each pipe arrangement of the plurality of pipe arrangements;
a pressure detection part that is disposed on a portion which requires a desired pressure or flow rate of the fluid in each pipe arrangement of the plurality of pipe arrangements and that detects the pressure of the fluid; and a control device that controls the fluid adjustment part based on a detection result of the pressure detection part, wherein each pipe arrangement of the plurality of pipe arrangements includes a water discharge passage that discharges water separated from a hydrogen gas which has flowed in each fuel cell stack of the plurality of fuel cell stacks, the fluid adjustment part is a drain valve that adjusts a flow rate of the water which flows through the water discharge passage, and the pressure detection part is disposed on a downstream side of the drain valve of the water discharge passage.

5. The fuel cell mount apparatus according to claim 1, wherein each pipe arrangement of the plurality of pipe arrangements comprises a cooling liquid discharge passage that allows a cooling liquid which has cooled each fuel cell stack of the plurality of fuel cell stacks to flow to a cooling device; and a cooling liquid feed passage that feeds the cooling liquid which has flowed through the cooling device to each fuel cell stack of the plurality of fuel cell stacks, the fluid adjustment part is a cooling liquid pump that allows the cooling liquid to flow to each fuel cell stack of the plurality of fuel cell stacks and the cooling liquid feed passage, and the pressure detection part detects a pressure difference between a portion of the cooling liquid feed passage close to a connection part with each fuel cell stack of the plurality of fuel cell stacks and a portion of the cooling liquid discharge passage close to a connection part with each fuel cell stack of the plurality of fuel cell stacks.

6. The fuel cell mount apparatus according to claim 1, wherein each pipe arrangement of the plurality of pipe arrangements comprises a gas pipe arrangement that connects a hydrogen tank to each fuel cell stack of the plurality of fuel cell stacks, the fluid adjustment part is a variable pressure adjustment valve that is arranged on the gas pipe arrangement in a vicinity of the hydrogen tank, and the pressure detection part is arranged in a vicinity of each fuel cell stack of the plurality of fuel cell stacks.

* * * * *